E. E. LARSON.
TRANSMISSION GEARING.
APPLICATION FILED JUNE 26, 1908.
917,463.
Patented Apr. 6, 1909.
3 SHEETS—SHEET 1.
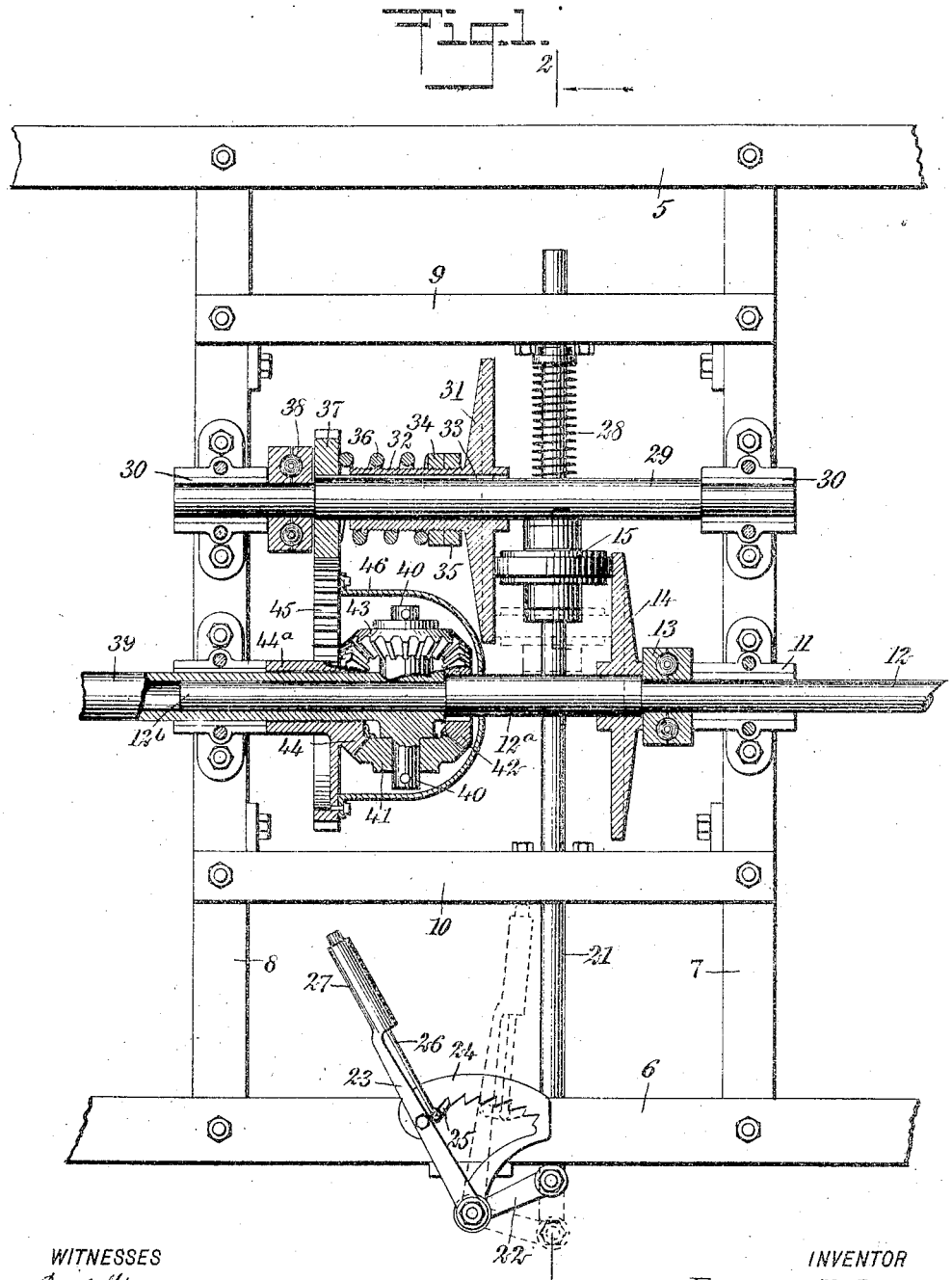
WITNESSES
Ben Jeff
W. Harrison
INVENTOR
Edward E. Larson
BY Munn & Co.
ATTORNEYS

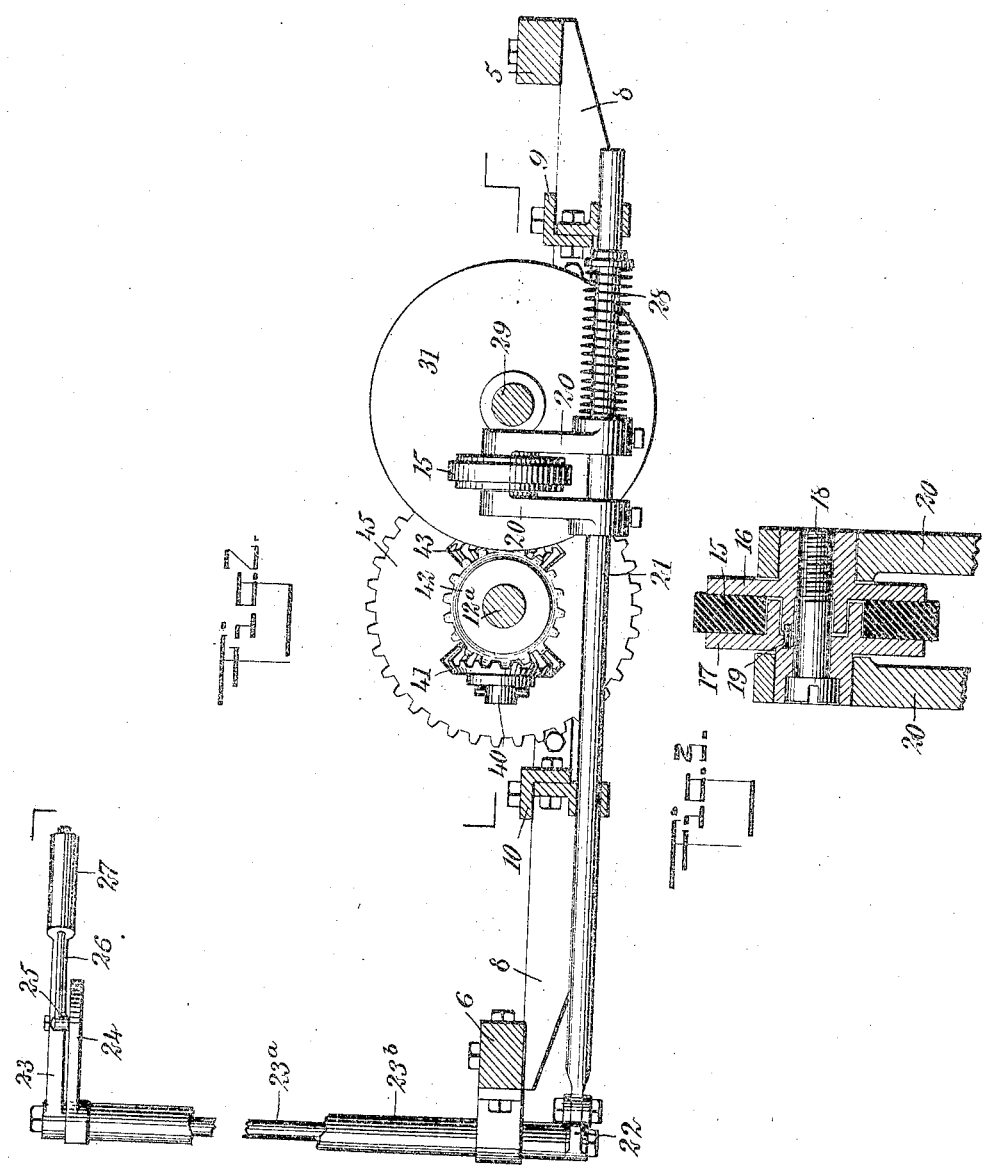

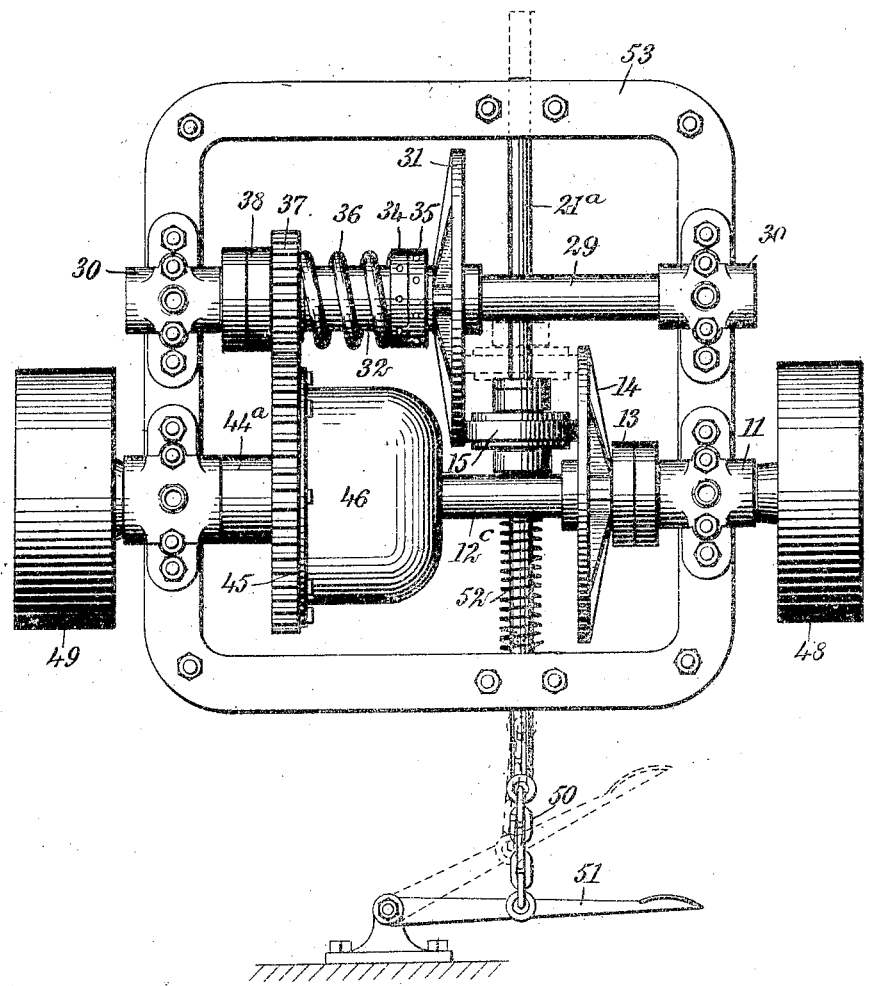

UNITED STATES PATENT OFFICE.

EDWARD EMIL LARSON, OF THOMPSON, IOWA.

TRANSMISSION-GEARING.

No. 917,463.     Specification of Letters Patent.     Patented April 6, 1909.

Application filed June 26, 1908. Serial No. 440,476.

*To all whom it may concern:*

Be it known that I, EDWARD EMIL LARSON, a citizen of the United States, and a resident of Thompson, in the county of Winnebago and State of Iowa, have invented a new and Improved Transmission - Gearing, of which the following is a full, clear, and exact description.

My invention relates to transmission gear10 ings, my more particular purpose being to produce a type of transmission gearing in which the power is transmitted through gears acting upon a revoluble member, this revoluble member being retarded to a greater or lesser extent by aid of friction gears, the degree of retardation governing the positiveness of the drive, and also controlling the speed of the driven element as compared with that of the driving element.

More particularly stated my invention comprises a driven shaft, a driving shaft, planetary gear movement for transmitting power from the driving shaft to the driven shaft, one member of the planetary gear movement meshing with a pinion mounted rigidly upon a countershaft and this countershaft being driven at a variable speed by aid of mechanism propelled directly from the driving shaft, the arrangement being such that variations in the speed of the countershaft retard, to a greater or lesser extent, the freedom of the planetary gear movement, and in this manner control indirectly the speed and power of the driven shaft as com35 pared with the power and speed of the driving shaft.

Reference is to be had to the accompanying drawings forming a part of this specification, in which similar characters of refer40 ence indicate corresponding parts in all the figures.

Figure 1 is a view, partly in elevation and partly in section on the line 1—1 of Fig. 2, looking in the direction of the arrow, show45 ing one form of my improved transmission gearing, this view showing the driving shaft, the driven shaft the planetary gear movement, and the various friction gear members for controlling, by aid of a lever, the speed of the countershaft; Fig. 2 is a vertical section upon the line 2—2 of Fig. 1, looking in the direction of the arrow, this view showing the change speed mechanism and the manner in which the same is con55 trolled by aid of a hand lever; Fig. 3 is a fragmentary section through the friction wheel for transmitting power from one of the friction disks to another, in order to enable the driving shaft to cause the rotation of the countershaft; and Fig. 4 is an elevation showing my invention as controlled by aid of a treadle.

Mounted upon sills 5, 6 are beams 7, 8 supporting cross bars 9, 10. Mounted upon the beam 7 is a bearing 11 supporting a revoluble driving shaft 12. Encircling this shaft is a ball bearing 13. The driving shaft 12 is provided with an enlarged portion 12$^a$ and also with a projecting portion 12$^b$, the diameter of which is substantially the same as that of the driving shaft aside from the enlarged portion 12$^a$. Mounted rigidly upon the enlarged portion 12$^a$ is a friction disk 14 which engages a friction wheel 15. This friction wheel, see Fig. 3, is provided with oppositely disposed disks 16, 17 held together by a bolt 18 and a key 19. A U-frame 20 supports the friction wheel 15 and serves as a bearing for the same. The U-frame 20 is mounted upon a slide rod 21, the latter being supported by the cross bars 9, 10 and the sill 6. Journaled to one end of the slide rod 21 is a rocking arm 22 which is actuated by a hand lever 23 (see Fig. 2), this rocking arm being connected by a rocking shaft 23$^a$ extending through a bearing sleeve 23$^b$ which is supported upon the framework. A rack 24 is mounted upon the sill 6 and is engaged by a pawl 25 carried by the hand lever 23. This pawl is controlled by a sliding rod 26 which extends into a handle 27, the latter being of cylindrical form and made hollow so as to accommodate a spring for pulling upon the rod 26 so as to cause the pawl 25 to normally engage the rack 24. The slide rod 21 is encircled by a spiral spring 28, the purpose of which is to retain the sliding rod 21, friction wheel 15 and parts immediately connected therewith, in their respective normal positions except when the spring 28 is compressed, or in other words, when the hand lever 23 is moved to the left according to Fig. 1.

A countershaft is shown at 29 and is journaled in bearings 30. A friction disk 31 is mounted upon the countershaft 29 and is provided with a sleeve 32. This sleeve is threaded externally and is connected with the countershaft 29 by aid of a spline 33.

The threaded sleeve 32 is provided with an adjustable nut 34 and a lock nut 35. A spiral spring 36 encircles the threaded stem 32 and bears against the adjustable nut 34. This spiral spring also engages a pinion 37 which is secured firmly upon the countershaft 29, this countershaft being provided with a ball bearing 38.

At 39 is a driven shaft which is of tubular form. This driven shaft fits over the portion 12$^b$ of the driving shaft and is revoluble in relation to the latter. The driven shaft 39 is provided with two trunnions 40. Revolubly mounted upon the trunnions 40 is a bevel gear 41 which meshes with a bevel gear 42, of the same size, the latter being keyed upon the portion 12$^a$ of the driving shaft. The bevel gear 42 meshes with a bevel gear 43 and the latter meshes with a bevel gear 44. This last-mentioned bevel gear is provided with a sleeve 44$^a$ integral with it, the sleeve encircling the shaft 39 and being revoluble relatively to the same. The bevel gear 44 is integral with a spur gear 45 which meshes with the pinion 37. A casing 46 having a substantially hemispherical form, is bolted upon the spur gear 45 and turns with it. The portion 12$^a$ of the shaft 12 extends through this casing.

In the form shown in Fig. 4 the driving shaft is shown at 12$^c$ and mounted upon it is a driving pulley 48, and a driven pulley is shown at 49. A sliding rod is shown at 21$^a$ and is quite similar in its action to the sliding rod 21 shown in the other views. It is connected by a chain 50 with a treadle 51 and is drawn downwardly by aid of this treadle. A spring 52 encircles the slide rod 21$^a$ and is used for retracting the same. A framework 53 supports the parts shown in Fig. 4. Otherwise than as stated, the construction and action of the parts appearing in this view are the same as the construction and action of the parts shown in the other views.

The operation of my device is as follows: Power being applied to the driving shaft, the bevel gear 42 necessarily turns with the driving shaft. The bevel gears 41, 43, because they mesh with the bevel gear 42, tend to turn and would turn freely except for the fact that they are retarded by the bevel gear 44. The latter can turn only as permitted by the rotation of the spur gear 45, and the rotation of this spur gear is dependent largely upon the freedom of movement of the pinion 37 and consequently of the countershaft 29. If the countershaft 29 were otherwise entirely free, it would simply rotate in idleness, thereby preventing the power received from the driving shaft from being transmitted any farther than the countershaft 29. This countershaft, however, is not free. It can travel only as allowed by the friction disk 31, and the latter is restricted in its rotation because of its contact with the friction wheel 15, the latter in turn being controllable directly by the friction disk 14 which turns positively with the driving shaft. As the slide rod 21 or 21$^a$ is moved at will so as to shift the position of the friction wheel, the speed of the driven shaft, as compared with that of the driving shaft, is varied within wide limits. The form of the device shown in Fig. 1 may be employed in connection with a motor driven vehicle. In such event, the engine should be supplied with a governor. The engine may then be run constantly at a uniform speed, although the car may remain stationary or may be run at any desired speed within the capacity of the machine.

When the mechanism shown in Fig. 1 is used in a shop for the purpose of handling power, it may take the place of an immense lot of shafting and countershafting. I find that in the apparatus above described the tendency of the friction wheels to slip is very slight as compared with the friction wheels used ordinarily in friction gears.

If the friction wheel 15 be caused to occupy the general position indicated in Fig. 1, its general plane is approximately in the pitch line between gear 45 and pinion 37. When this is the case the constructive or effective diameter of the disk 14 in contact with the center of the friction wheel 15 bears the same relation to the actual diameter of the disk 14 as the diameter of the spur gear 45 has to that of the pinion 37. If, now, the shaft 12 is turned and the shaft 39 meets with resistance, the gear 45 (acting through the medium of the pinion 37) must turn the countershaft 29 at a speed corresponding to the speed at which the friction disk 14 (acting through the medium of the friction disk 31) tends to turn the countershaft 29. If, now, the friction wheel 15 be moved nearer the center of the friction disk 14 (so as to reduce the constructive or effective diameter of the latter) it follows that the countershaft 29 and the spur gear 45 must rotate at slower speeds, and the driven shaft 39 must rotate in the same direction as the driving shaft 12 and with a speed equal to the difference between the speed of the driving shaft 12 and that of the spur gear 45 which rotates in the opposite direction.

As may be understood from the foregoing explanation the driving shaft 12 actuates the driven shaft 39, not through the medium of the friction disks and friction wheel considered as gear members, but rather through the medium of the bevel gears. The friction disks and friction wheel therefore merely counteract the rotational reaction which might otherwise be set up in the spur gear 45. The transmission from the driving shaft 12 to the driven shaft 39 is therefore due primarily to the action of the parts in the casing 46, these parts together constituting a planetary movement. If the spur gear 45 be given a diameter twice as great as that of the pinion 37, and the friction disk 31 be given twice the diameter of the pinion 37, and the friction wheel 15 be next moved into the position indicated by dotted lines in Fig. 1, the highest speed of the driven shaft is attained. In this event only about one quarter as much power would be required of the friction wheel 15 in order to resist the reaction of the spur gear 45, as would be delivered from the driving shaft 12 through various parts to the driven shaft 39 under other conditions. With the parts built and adjusted for the slowest transmission to the driven shaft, about one half as much power would be required to overcome the reaction of the spur gear 45. If the spur gear 45 be given a diameter three times as great as that of the pinion 37, and the friction disks 14 and 31 be proportionately increased in size, the work required for the friction wheel 15 is only from one-thirteenth to one-ninth what might otherwise be required. It will thus be seen that by varying the proportion of various revoluble parts the speed and power may be varied correspondingly within wide limits. The pressure of the friction disk 31 against the friction wheel 15 is a factor in the control of the driven shaft 39. In order to increase or diminish the pressure of the friction disk 31 upon the friction wheel 15, the nut 34 is turned and after the required tension of the spring 36 is attained, the lock nut 35 secures the nut 34 in position. The operator by thus adjusting the tension of the spring 36 may increase the range of usefulness of the device. The ball bearings used are of the ordinary ball thrust pattern.

I do not limit myself to any particular proportions for any of the parts shown, nor to any special materials out of which the parts are constructed.

Having thus described my invention, I claim as new and desire to secure by Letters Patent:

1. The combination of a driving shaft, a bevel gear secured rigidly thereupon, a tubular driven shaft mounted on the driving shaft and provided with trunnions, bevel gears mounted upon said trunnions and meshing with said first-mentioned bevel gear, a bevel gear meshing with said bevel gears mounted upon said trunnions, and having a sleeve mounted to turn on the driven shaft, a revoluble member connected with said bevel gear, and means controllable at will for allowing said revoluble member varying degrees of freedom.

2. The combination of a driving shaft, a tubular driven shaft mounted on the driving shaft, gear members connected directly with said driving shaft and with said driven shaft for enabling power to be transmitted from said driving shaft to said driven shaft, one of said gear members being mounted to turn on the driven shaft, a friction disk mounted upon said driving shaft and actuated thereby, a friction wheel engaging said friction disk, a second friction disk engaging said friction wheel, a countershaft for supporting said last-mentioned friction disk, a pinion secured rigidly upon said countershaft and meshing with said gear member mounted to turn on the driven shaft, and means controllable at will for varying the position of said friction wheel relatively to said friction disks.

3. In a transmission gearing, the combination of a driving shaft, a driven shaft, gearing connecting said driving shaft with said driven shaft, friction mechanism connected with said driving shaft and with said driven shaft for the purpose of qualifying the action of said gearing, the said friction mechanism including a friction wheel, a slide rod carrying said friction wheel, a spring for maintaining the slide rod in normal position, and means for moving the slide rod to regulate the action of said friction mechanism.

4. In a transmission gearing, the combination of a driving shaft, a driven shaft, gear members connected with said driving shaft and with said driven shaft, and friction mechanism for qualifying the effect of said gear members, said friction mechanism including a friction disk and a friction wheel, a slide rod, a frame mounted on said slide rod and forming a bearing for the friction wheel, a spring for maintaining the slide rod in normal position, and means controllable at will for moving said slide rod to shift the position of said friction wheel relatively to said friction disk.

5. In a transmission gearing, the combination with a driving shaft, a driven shaft and gearing connecting said driving shaft with said driven shaft, of a countershaft, gearing connecting the countershaft with the driven shaft, a friction disk mounted on the countershaft, a friction disk mounted on the driving shaft, a spring pressed slide rod, a frame mounted upon the slide rod, a friction wheel journaled in said frame and adapted to engage the said friction disks, means connected with the slide rod for moving the same against the tension of its spring to shift the position of the friction wheel relatively to said friction disks, and means for regulating the pressure of the friction disk carried by said countershaft upon said friction wheel.

6. The combination of a driving shaft, a bevel gear secured rigidly thereon, a tubular driven shaft mounted on the driving shaft and provided with trunnions, bevel gears mounted upon said trunnions and meshing with said first mentioned bevel gear, a bevel gear meshing with the bevel gears on said trunnions and having a sleeve mounted to turn on said driven shaft, a spur gear integral with the last mentioned bevel gear, a countershaft, a pinion thereon meshing with said spur gear, friction mechanism connected with said driving shaft and with said countershaft, and means controllable at will for regulating the action of said friction mechanism.

In testimony whereof I have signed my name to this specification in the presence of two subscribing witnesses.

EDWARD EMIL LARSON.

Witnesses:
A. N. ANDERSON,
E. R. ALQUIST.